United States Patent
Sasaki et al.

(10) Patent No.: US 8,896,967 B2
(45) Date of Patent: Nov. 25, 2014

(54) MAGNETIC HEAD FOR PERPENDICULAR MAGNETIC RECORDING HAVING A MAIN POLE AND A SHIELD

(75) Inventors: Yoshitaka Sasaki, Santa Clara, CA (US); Hiroyuki Ito, Milpitas, CA (US); Kazuki Sato, Milpitas, CA (US); Atsushi Iijima, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 898 days.

(21) Appl. No.: 13/084,168

(22) Filed: Apr. 11, 2011

(65) Prior Publication Data

US 2012/0257304 A1 Oct. 11, 2012

(51) Int. Cl.
*G11B 5/187* (2006.01)
*G11B 5/31* (2006.01)
*G11B 5/127* (2006.01)
*G11B 5/60* (2006.01)

(52) U.S. Cl.
CPC .............. *G11B 5/315* (2013.01); *G11B 5/1278* (2013.01); *G11B 5/3116* (2013.01); *G11B 5/314* (2013.01); *G11B 5/607* (2013.01)
USPC ............ 360/125.27; 360/125.17; 360/123.06; 360/125.26; 360/125.28

(58) Field of Classification Search
USPC ............. 360/125.27, 125.17, 123.06, 125.28, 360/125.26, 123.18, 123.03, 123.59, 360/123.01, 125.7
See application file for complete search history.

(56) References Cited

U.S. PATENT DOCUMENTS

| | | | |
|---|---|---|---|
| 4,974,110 A * | 11/1990 | Kanamine et al. | 360/125.12 |
| 6,954,340 B2 | 10/2005 | Shukh et al. | |
| 2002/0064003 A1 | 5/2002 | Kim et al. | |
| 2005/0128637 A1 | 6/2005 | Johnston et al. | |
| 2006/0044682 A1 * | 3/2006 | Le et al. | 360/126 |
| 2010/0165517 A1 | 7/2010 | Araki et al. | |

FOREIGN PATENT DOCUMENTS

| | | |
|---|---|---|
| JP | 2002-197619 | 7/2002 |
| JP | 2010-157303 | 7/2010 |

OTHER PUBLICATIONS

U.S. Appl. No. 13/556,784, filed on Jul. 24, 2012 in the name of Sasaki et al.
U.S. Appl. No. 13/556,654, filed on Jul. 24, 2012 in the name of Sasaki et al.
Aug. 27, 2013 Office Action issued in Japanese Patent Application No. 2011-241854 (with English Translation).

* cited by examiner

*Primary Examiner* — Julie Anne Watko
(74) *Attorney, Agent, or Firm* — Oliff PLC

(57) ABSTRACT

A magnetic head includes a coil, a main pole, a write shield, and first and second yoke layers. The first and second yoke layers are magnetically connected to the write shield and aligned along the direction of travel of a recording medium such that the main pole is interposed therebetween. The coil includes a winding portion of planar spiral shape that is formed in one or more layers. The magnetic head further includes: a first coupling part located away from the medium facing surface and magnetically coupling the main pole and the second yoke layer to each other; and a second coupling part located away from the medium facing surface and magnetically coupling the first yoke layer and the second yoke layer to each other without touching the main pole. The winding portion is wound around the first coupling part, and a part of the winding portion passes between the first and second coupling parts.

5 Claims, 11 Drawing Sheets

MAGNETIC HEAD FOR PERPENDICULAR MAGNETIC RECORDING HAVING A MAIN POLE AND A SHIELD

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that includes a main pole and a shield.

2. Description of Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head unit having a magnetoresistive element (hereinafter, also referred to as MR element) for reading and a write head unit having an induction-type electromagnetic transducer for writing are stacked on a substrate. The write head unit includes a main pole that produces a magnetic field in a direction perpendicular to the plane of the recording medium. The main pole includes, for example, a track width defining portion having an end located in a medium facing surface that faces the recording medium, and a wide portion that is connected to the other end of the track width defining portion and is greater in width than the track width defining portion. The track width defining portion has a generally constant width. To achieve higher recording density, it is required that the write head unit of the perpendicular magnetic recording system be smaller in track width and improved in write characteristics such as an overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of the recording medium by means of an airflow that comes from the air inflow end into the space between the medium facing surface and the recording medium. The magnetic head is typically disposed near the air outflow end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erase). To increase the recording density, it is required to prevent the occurrence of adjacent track erase.

Providing a write shield near the main pole is effective for preventing the aforementioned skew-induced adjacent track erase and increasing the recording density. For example, U.S. Pat. No. 6,954,340 B2 and U.S. Patent Application Publication No. 2005/0128637 A1 describe a magnetic head including a write shield having an end face that is located in the medium facing surface to wrap around an end face of the main pole.

A magnetic head including a write shield is typically provided with one or more magnetic paths for connecting the write shield to a part of the main pole away from the medium facing surface. The write shield and the one or more magnetic paths function to capture a magnetic flux that is produced from the end face of the main pole and that expands in directions other than the direction perpendicular to the plane of the recording medium, and to thereby prevent the magnetic flux from reaching the recording medium. The write shield and the one or more magnetic paths also function to allow a magnetic flux that has been produced from the end face of the main pole and has magnetized the recording medium to flow back to the main pole. Thus, the magnetic head including the write shield allows prevention of the adjacent track erase and allows a further improvement in recording density.

U.S. Pat. No. 6,954,340 B2 and U.S. Patent Application Publication No. 2005/0128637 A1 describe a magnetic head including, as the aforementioned one or more magnetic paths, a magnetic path located forward along the direction of travel of the recording medium (i.e., on the trailing end side) relative to the main pole, and a magnetic path located backward along the direction of travel of the recording medium (i.e., on the leading end side) relative to the main pole.

It is effective for the magnetic head to have two magnetic paths leading from the write shield to the main pole so that the write shield can capture a lot of magnetic flux. However, this produces the following problem. If the magnetic head has two magnetic paths, there needs to be provided two coils of planar spiral shape corresponding to the two magnetic paths, or a coil of helical shape wound around the main pole. In either case, there is a problem because the coil structure and the structure in the vicinity of the coil(s) become complicated and a large number of steps are needed for the formation of the coil(s).

OBJECT AND SUMMARY OF THE INVENTION

It is an object of the present invention to provide a magnetic head for perpendicular magnetic recording that includes two magnetic paths leading from a write shield to a main pole with a simplified coil structure.

A magnetic head for perpendicular magnetic recording of the present invention includes: a medium facing surface that faces a recording medium; a coil that produces a magnetic field corresponding to data to be written on the recording medium; and a main pole. The main pole has an end face located in the medium facing surface, allows a magnetic flux corresponding to the magnetic field produced by the coil to pass, and produces a write magnetic field for writing the data on the recording medium by means of a perpendicular magnetic recording system.

The magnetic head of the present invention further includes: a write shield made of a magnetic material and having an end face located in the medium facing surface; a gap part made of a nonmagnetic material and disposed between the main pole and the write shield; and a first yoke layer and a second yoke layer that are aligned along a direction of travel of the recording medium such that the main pole is interposed between the first and second yoke layers, each of the first and second yoke layers being made of a magnetic material and magnetically connected to the write shield. The end face of the write shield includes a first end face portion located forward of the end face of the main pole along the direction of travel of the recording medium. The coil includes a winding portion of planar spiral shape that is formed in one or more layers.

The magnetic head of the present invention further includes: a first coupling part that is located away from the medium facing surface and magnetically couples the main pole and the second yoke layer to each other; and a second coupling part that is located away from the medium facing surface and magnetically couples the first yoke layer and the second yoke layer to each other without touching the main pole. The winding portion is wound around the first coupling part, and a part of the winding portion passes between the first coupling part and the second coupling part.

In the magnetic head of the present invention, the second coupling part may be located in a position other than between the coil and the medium facing surface. The second coupling part may be located farther from the medium facing surface than is the first coupling part.

The magnetic head of the present invention may be configured so that the first yoke layer is located backward of the main pole along the direction of travel of the recording medium, while the second yoke layer is located forward of the main pole along the direction of travel of the recording medium. Alternatively, the magnetic head may be configured so that the first yoke layer is located forward of the main pole along the direction of travel of the recording medium, while the second yoke layer is located backward of the main pole along the direction of travel of the recording medium.

In the magnetic head of the present invention, the end face of the write shield may further include a second, a third, and a fourth end face portion. The second end face portion may be located backward of the end face of the main pole along the direction of travel of the recording medium. The third and fourth end face portions may be located on opposite sides of the end face of the main pole in a track width direction.

The magnetic head of the present invention may further include a read head unit located backward of the first and second yoke layers along the direction of travel of the recording medium. In this case, the read head unit may include a read element that reads data written on the recording medium, and first and second read shield layers that are disposed such that the read element is interposed therebetween.

In the magnetic head for perpendicular magnetic recording of the present invention, there are formed first and second magnetic paths that lead from the write shield to the main pole. The first magnetic path passes through the second yoke layer and the first coupling part. The second magnetic path passes through the first yoke layer, the second coupling part, the second yoke layer, and the first coupling part. The coil is wound around the first coupling part, and a part of the coil passes between the first coupling part and the second coupling part. As a result, the magnetomotive force of the coil generates a magnetic flux that passes through the first magnetic path and a magnetic flux that passes through the second magnetic path so that the magnetic fluxes meet in the first coupling part. The present invention thus eliminates the need for providing two coils of planar spiral shape corresponding to the two magnetic paths, or a coil of helical shape wound around the main pole. Consequently, according to the present invention, it is possible to provide a simplified coil structure while providing the foregoing first and second magnetic paths that lead from the write shield to the main pole.

Other objects, features and advantages of the present invention will become fully apparent from the following description.

DETAILED DESCRIPTION OF THE PREFERRED EMBODIMENTS

First Embodiment

Figure 1:
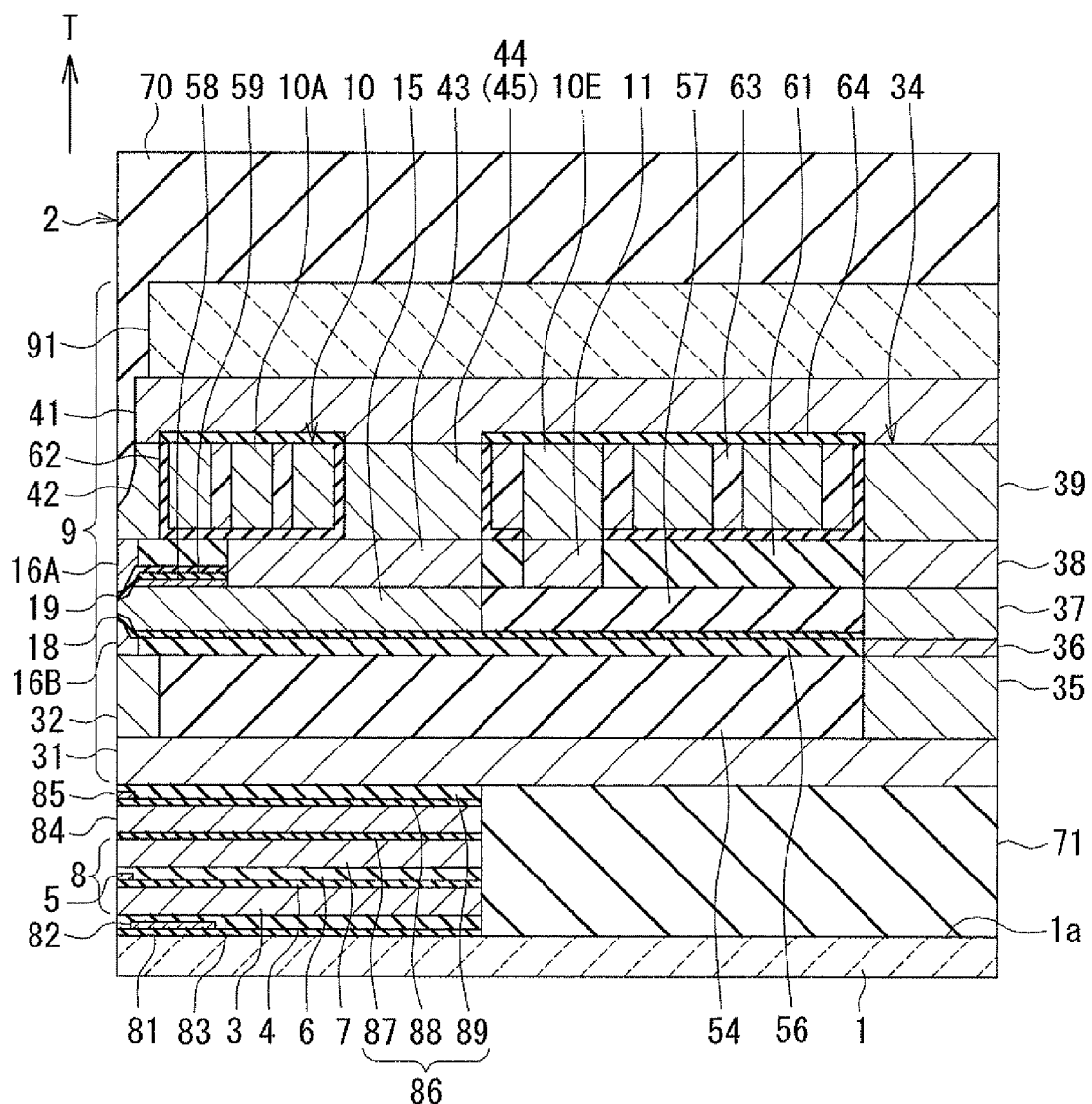
FIG. 1 is a cross-sectional view of a magnetic head according to a first embodiment of the invention.
Figure 2:
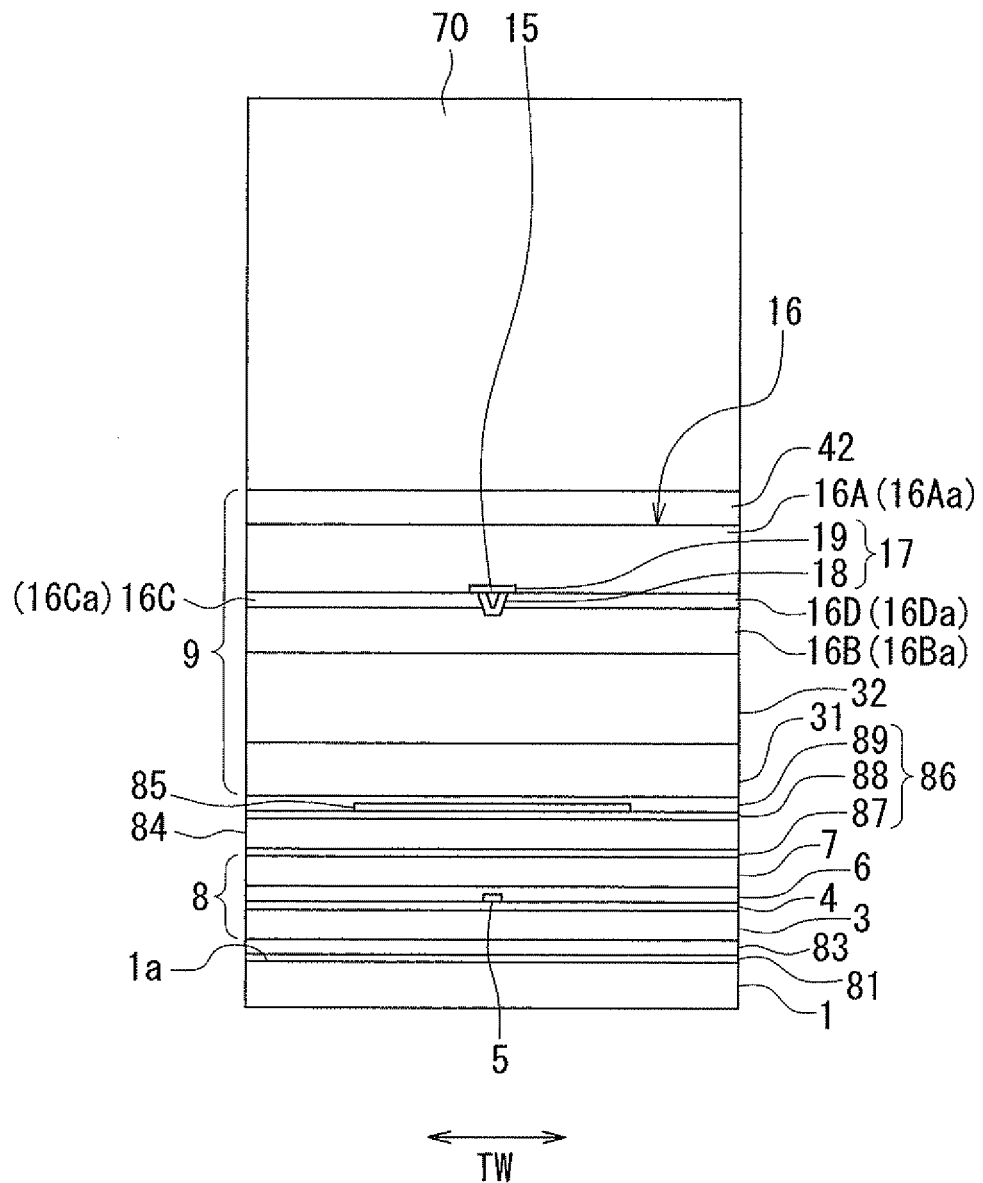
FIG. 2 is a front view showing the medium facing surface of the magnetic head according to the first embodiment of the invention.
Figure 3:
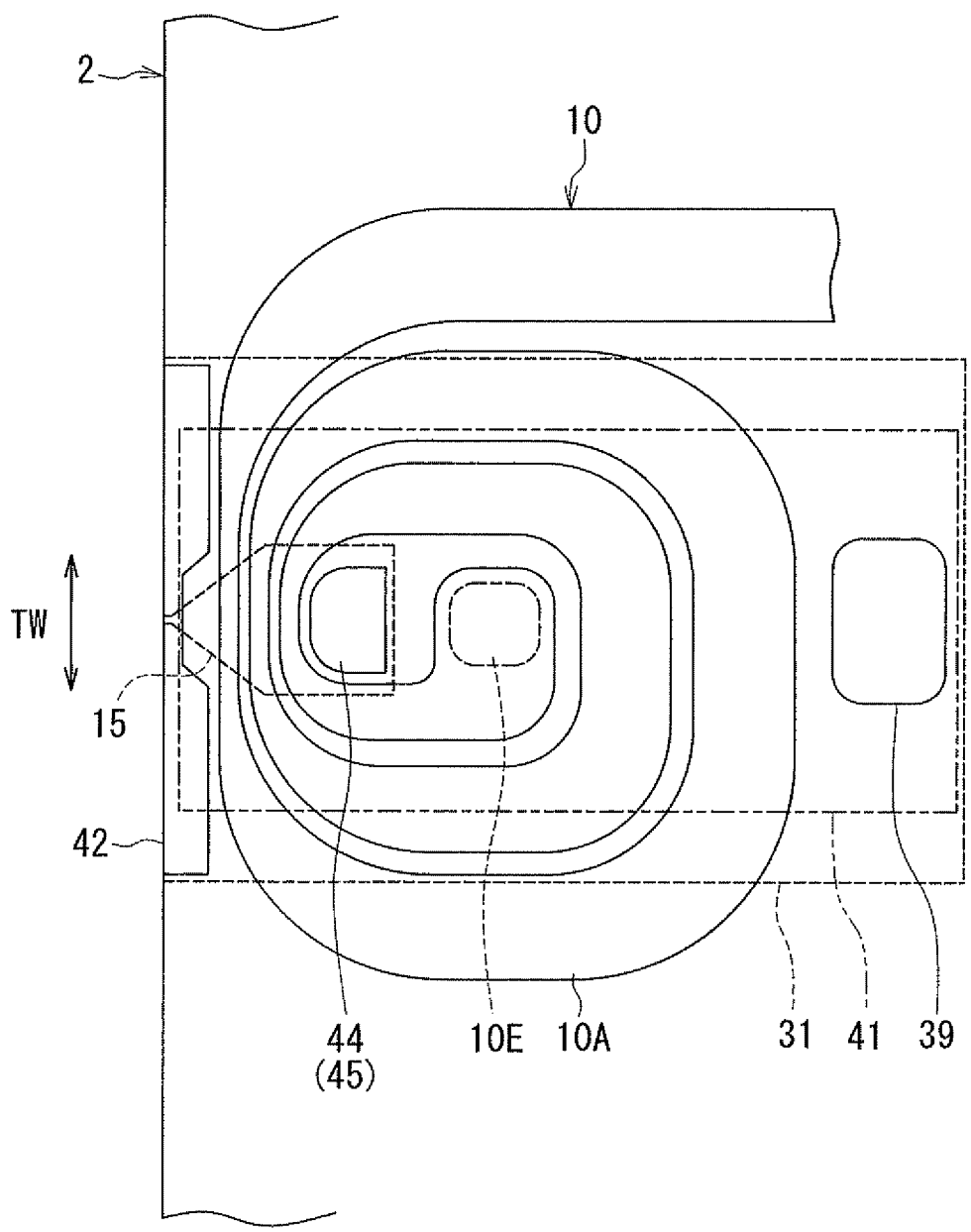
FIG. 3 is a plan view showing a coil of the magnetic head according to the first embodiment of the invention.
Figure 4:
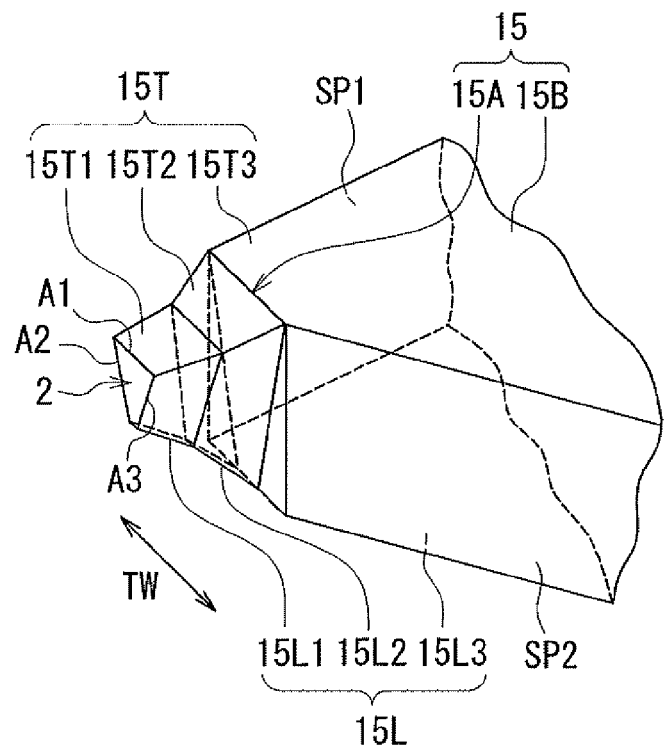
FIG. 4 is a perspective view showing part of a main pole near the medium facing surface in the magnetic head according to the first embodiment of the invention.

Embodiments of the present invention will now be described in detail with reference to the drawings. First, reference is made to FIG. 1 to FIG. 4 to describe the configuration of a magnetic head according to a first embodiment of the invention. FIG. 1 is a cross-sectional view of the magnetic head according to the present embodiment. Note that FIG. 1 shows a cross section perpendicular to the medium facing surface and the top surface of the substrate. The arrow with the symbol T in FIG. 1 indicates the direction of travel of the recording medium. FIG. 2 is a front view showing the medium facing surface of the magnetic head according to the present embodiment. FIG. 3 is a plan view showing a coil of the magnetic head according to the present embodiment. FIG. 4 is a perspective view showing part of a main pole near the medium facing surface in the magnetic head according to the present embodiment. The arrows with the symbol TW in FIG. 2 to FIG. 4 indicate the track width direction.

As shown in FIG. 1 and FIG. 2, the magnetic head for perpendicular magnetic recording (hereinafter simply referred to as magnetic head) according to the present embodiment includes: a substrate 1 made of a ceramic material such as aluminum oxide-titanium carbide ($Al_2O_3$—TiC) and having a top surface 1a; an insulating layer 81 made of an insulating material and disposed on the top surface 1a of the substrate 1; a heater 82 disposed on the insulating layer 81; and an insulating layer 83 made of an insulating material and disposed to cover the insulating layer 81 and the heater 82. The insulating layers 81 and 83 are made of alumina ($Al_2O_3$), for example. The heater 82 will be described in detail later.

The magnetic head further includes a read head unit 8 disposed forward along the direction T of travel of the recording medium (i.e., on the trailing end side) relative to the heater 82. The read head unit 8 includes: a first read shield layer 3 made of a magnetic material and disposed on the insulating layer 83; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 2 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of layers constituting the GMR element.

The magnetic head further includes: a write head unit 9 disposed forward of the read head unit 8 along the direction T of travel of the recording medium; and an expansion layer 84, a sensor 85, and a nonmagnetic part 86 that are disposed between the read head unit 8 and the write head unit 9. The nonmagnetic part 86 is made of a nonmagnetic material. The material of the nonmagnetic part 86 may be alumina, for example.

The nonmagnetic part 86 includes nonmagnetic layers 87, 88, and 89. The nonmagnetic layer 87 is disposed on the second read shield layer 7. The expansion layer 84 is disposed on the nonmagnetic layer 87. The nonmagnetic layer 88 is disposed to cover the expansion layer 84. The sensor 85 is disposed on the nonmagnetic layer 88. The nonmagnetic layer 89 is disposed to cover the sensor 85.

The magnetic head further includes an insulating layer 71 made of an insulating material and disposed on the top surface 1a of the substrate 1 to surround the read head unit 8, the expansion layer 84 and the nonmagnetic part 86. The insulating layer 71 is made of alumina, for example. The top surfaces of the insulating layer 71 and the nonmagnetic layer 89 are even with each other.

The write head unit 9 includes a coil 10, a lead layer 11, a main pole 15, a write shield 16, a gap part 17, and yoke layers 31 and 41. The coil 10 and the lead layer 11 are both made of a conductive material such as copper. The lead layer 11 is used to pass an electric current through the coil 10. As shown in FIG. 3, the coil 10 includes a winding portion 10A of planar spiral shape. In FIG. 1 and FIG. 3, the reference symbol 10E indicates a coil connection part of the coil 10 electrically connected to the lead layer 11.

The coil 10 produces a magnetic field corresponding to data to be written on the recording medium. The main pole 15 has an end face located in the medium facing surface 2. The main pole 15 allows a magnetic flux corresponding to the magnetic field produced by the coil 10 to pass, and produces a write magnetic field for writing data on the recording medium by means of the perpendicular magnetic recording system. FIG. 1 shows a cross section that intersects the end face of the main pole 15 located in the medium facing surface 2 and that is perpendicular to the medium facing surface 2 and the top surface 1a of the substrate 1 (the cross section will hereinafter be referred to as main cross section).

The write shield 16 has an end face located in the medium facing surface 2. The end face of the write shield 16 includes first to fourth end face portions 16Aa, 16Ba, 16Ca, and 16Da. The first end face portion 16Aa is located forward of the end face of the main pole 15 along the direction T of travel of the recording medium. The second end face portion 16Ba is located backward of the end face of the main pole 15 along the direction T of travel of the recording medium. The third and fourth end face portions 16Ca and 16Da are located on opposite sides of the end face of the main pole 15 in the track width direction TW. In the medium facing surface 2, the first to fourth end face portions 16Aa, 16Ba, 16Ca, and 16Da are arranged to wrap around the end face of the main pole 15.

The write shield 16 is made of a magnetic material. Examples of materials that can be used for the write shield 16 include CoFeN, CoNiFe, NiFe, and CoFe.

The yoke layers 31 and 41 are magnetically connected to the write shield 16 and are aligned along the direction T of travel of the recording medium such that the main pole 15 is interposed between the yoke layers 31 and 41. The yoke layer 31 is located backward of the main pole 15 along the direction T of travel of the recording medium. The yoke layer 41 is located forward of the main pole 15 along the direction T of travel of the recording medium. Each of the yoke layers 31 and 41 is made of a magnetic material. Examples of materials that can be used for the yoke layers 31 and 41 include CoFeN, CoNiFe, NiFe, and CoFe. In the present embodiment, the yoke layer 31 corresponds to the first yoke layer of the invention, and the yoke layer 41 corresponds to the second yoke layer of the invention.

The write head unit 9 further includes a magnetic layer 32 that is made of a magnetic material and magnetically couples the yoke layer 31 and the write shield 16 to each other, and a magnetic layer 42 that is made of a magnetic material and magnetically couples the yoke layer 41 and the write shield 16 to each other. Examples of materials that can be used for the magnetic layers 32 and 42 include CoFeN, CoNiFe, NiFe, and CoFe.

The write head unit 9 further includes a first coupling part 44 and a second coupling part 34. The first coupling part 44 is located away from the medium facing surface 2 and magnetically couples the main pole 15 and the yoke layer 41 to each other. The second coupling part 34 is located away from the medium facing surface 2 and magnetically couples the yoke layer 31 and the yoke layer 41 to each other without touching the main pole 15. In the example shown in FIG. 1, the second coupling part 34 is located in a position other than between the coil 10 and the medium facing surface 2, particularly in a position farther from the medium facing surface 2 than the position of the first coupling part 44.

The first coupling part 44 and the second coupling part 34 are each made of a magnetic material. Examples of materials that can be used for the first and second coupling parts 44 and 34 include CoFeN, CoNiFe, NiFe, and CoFe. The first coupling part 44 is composed of a single magnetic layer 45. The second coupling part 34 includes magnetic layers 35 to 39.

The yoke layer 31 is disposed over the insulating layer 71 and the nonmagnetic layer 89. The magnetic layers 32 and 35 are both disposed on the yoke layer 31. The yoke layer 31 and the magnetic layer 32 have their respective end faces located in the medium facing surface 2. The magnetic layer 35 is located away from the medium facing surface 2.

The magnetic head further includes: a not-shown insulating layer that is made of an insulating material and disposed over the insulating layer 71 and the nonmagnetic layer 89 around the yoke layer 31; and an insulating layer 54 that is made of an insulating material and disposed over the yoke layer 31 and the not-shown insulating layer around the magnetic layers 32 and 35. The not-shown insulating layer and the insulating layer 54 are made of alumina, for example. The top surfaces of the magnetic layers 32 and 35 and the insulating layer 54 are even with each other.

As shown in FIG. 2, the write shield 16 includes a first shield 16A, a second shield 16B, and two side shields 16C and 16D. The two side shields 16C and 16D are located on opposite sides of the main pole 15 in the track width direction TW. The first shield 16A is located forward of the main pole 15 along the direction T of travel of the recording medium. The second shield 16B is located backward of the main pole 15 along the direction T of travel of the recording medium. The side shields 16C and 16D magnetically couple the first shield 16A and the second shield 16B to each other.

The first shield 16A has the first end face portion 16Aa. The second shield 16B has the second end face portion 16Ba. The side shield 16C has the third end face portion 16Ca. The side shield 16D has the fourth end face portion 16Da.

The second shield 16B is disposed on the magnetic layer 32. The magnetic layer 36 is disposed on the magnetic layer 35. The magnetic head further includes an insulating layer 56 made of an insulating material. The insulating layer 56 is disposed over part of the top surface of the magnetic layer 32 and the top surface of the insulating layer 54 around the second shield 16B and the magnetic layer 36. The insulating layer 56 is made of alumina, for example.

The main pole 15 has: a bottom end 15L which is an end closer to the top surface 1a of the substrate 1; a top surface 15T opposite to the bottom end 15L; and first and second side parts SP1 and SP2 that are opposite to each other in the track width direction TW. The side shield 16C has a first sidewall that is opposed to the first side part SP1 of the main pole 15. The side shield 16D has a second sidewall that is opposed to the second side part SP2 of the main pole 15.

The gap part 17 is made of a nonmagnetic material and disposed between the main pole 15 and the write shield 16. The gap part 17 includes a first gap layer 18 and a second gap layer 19. The first gap layer 18 is disposed between the main pole 15 and the second shield 16B and between the main pole 15 and the side shields 16C and 16D. The second gap layer 19 is disposed between the main pole 15 and the first shield 16A.

The side shields 16C and 16D are disposed on the second shield 16B and in contact with the top surface of the second shield 16B. The first gap layer 18 is arranged to extend along the sidewalls of the side shields 16C and 16D, the top surface of the second shield 16B, and the top surface of the insulating layer 56. The first gap layer 18 is made of a nonmagnetic material. The nonmagnetic material used to form the first gap layer 18 may be an insulating material or a nonmagnetic metal material. Alumina is an example of insulating materials that can be used to form the first gap layer 18. Ru is an example of nonmagnetic metal materials that can be used to form the first gap layer 18. The first gap layer 18 has an opening for exposing the top surface of the magnetic layer 36. The magnetic layer 37 is disposed on the magnetic layer 36.

The main pole 15 is made of a magnetic metal material. Examples of materials that can be used for the main pole 15 include NiFe, CoNiFe, and CoFe. The shape of the main pole 15 will be described in detail later.

The magnetic head further includes a nonmagnetic layer 57 made of a nonmagnetic material and disposed around the main pole 15, the second shield 16B, the side shields 16C and 16D, and the magnetic layer 37. In the present embodiment, the nonmagnetic layer 57 is made of a nonmagnetic insulating material such as alumina, in particular.

The magnetic head further includes: a nonmagnetic metal layer 58 made of a nonmagnetic metal material and disposed on part of the top surface 15T of the main pole 15 at a position away from the medium facing surface 2; and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The second gap layer 19 is disposed to cover the main pole 15, the nonmagnetic metal layer 58, and the insulating layer 59. The second gap layer 19 is made of a nonmagnetic material. Examples of materials that can be used for the second gap layer 19 include nonmagnetic insulating materials such as alumina, and nonmagnetic conductive materials such as Ru, NiCu, Ta, W, NiB, and NiP.

The first shield 16A is disposed over the side shields 16C and 16D and the second gap layer 19, and is in contact with the top surfaces of the side shields 16C and 16D and the second gap layer 19. In the medium facing surface 2, part of the end face of the first shield 16A is located at a predetermined distance from the end face of the main pole 15, the distance being created by the thickness of the second gap layer 19. The thickness of the second gap layer 19 preferably falls within the range of 5 to 60 nm, and may be 30 to 60 nm, for example. The end face of the main pole 15 has a side that is adjacent to the second gap layer 19, and the side defines the track width.

The write head unit 9 further includes a magnetic layer 43 made of a magnetic material and disposed on the main pole 15 at a position away from the medium facing surface 2. The lead layer 11 is disposed on the nonmagnetic layer 57 at a position that is farther from the medium facing surface 2 than the position of the magnetic layer 43. The magnetic layer 38 is disposed on the magnetic layer 37. Examples of materials that can be used for the magnetic layer 43 include CoFeN, CoNiFe, NiFe, and CoFe.

The magnetic head further includes a nonmagnetic layer 61 disposed around the lead layer 11, the first shield 16A and the magnetic layers 38 and 43. The nonmagnetic layer 61 is made of an inorganic insulating material, for example. Examples of the inorganic insulating material include alumina and silicon oxide. The top surfaces of the lead layer 11, the first shield 16A, the magnetic layers 38 and 43 and the nonmagnetic layer 61 are even with each other.

The magnetic layer 42 is disposed over the first shield 16A and the nonmagnetic layer 61. The magnetic layer 42 has an end face located in the medium facing surface 2. The magnetic layer 45 is disposed on part of the top surface of the magnetic layer 43 at a position away from the medium facing surface 2. The magnetic layer 39 is disposed on the magnetic layer 38.

The winding portion 10A of the coil 10 is wound around the first coupling part 44 (the magnetic layer 45), and a part of the winding portion 10A passes between the first coupling part 44 (the magnetic layer 45) and the second coupling part 34 (the magnetic layer 39). In the example shown in FIG. 3, the winding portion 10A is wound approximately three turns around the first coupling part 44 (the magnetic layer 45).

The magnetic head further includes: an insulating layer 62 made of an insulating material and interposed between the coil 10 and each of the magnetic layers 39, 42, 43 and 45 and the nonmagnetic layer 61; an insulating layer 63 made of an insulating material and disposed around the coil 10 and in the space between every adjacent turns of the coil 10; a not-shown insulating layer made of an insulating material and disposed around the magnetic layers 39 and 42 and the insulating layer 62; and an insulating layer 64 made of an insulating material and disposed to cover the coil 10 and the insulating layers 62 and 63. The insulating layer 62 has an opening for exposing part of the top surface of the lead layer 11. The coil connection part 10E of the coil 10 is electrically connected to the lead layer 11 through the opening of the insulating layer 62. The insulating layers 62 and 64 and the not-shown insulating layer are made of alumina, for example. The insulating layer 63 is made of photoresist, for example.

The yoke layer 41 is disposed over the magnetic layers 39, 42 and 45 and the insulating layer 64. The yoke layer 41 has an end face facing toward the medium facing surface 2. This end face is located at a distance from the medium facing surface 2. The first coupling part 44 (the magnetic layer 45) and the magnetic layer 43 magnetically couple the main pole 15 and the yoke layer 41 to each other. The second coupling part 34 (the magnetic layers 35 to 39) magnetically couples the yoke layer 31 and the yoke layer 41 to each other. The magnetic layer 42 magnetically couples the first shield 16A of the write shield 16 and the yoke layer 41 to each other.

The write head unit 9 further includes a stopper layer 91 disposed on the yoke layer 41. The stopper layer 91 is made of a nonmagnetic material that has a high thermal conductivity, a small coefficient of linear thermal expansion, and a high hardness. It is preferred that the material of the stopper layer 91 have a higher thermal conductivity, a smaller coefficient of linear thermal expansion, and a higher Vickers hardness than those of alumina. An example of such a material is SiC. Without the stopper layer 91, the yoke layer 41 and the magnetic layer 42 would expand with the heat generated by the coil 10, thereby making part of the medium facing surface 2 protrude. The stopper layer 91 absorbs the heat generated by the coil 10 and suppresses the expansion of the yoke layer 41 and the magnetic layer 42 toward the medium facing surface 2. This makes it possible to prevent the medium facing surface 2 from protruding in part due to the heat generated by the coil 10.

The magnetic head further includes a protection layer 70 made of a nonmagnetic material and disposed to cover the write head unit 9. The protection layer 70 is made of, for example, an inorganic insulating material such as alumina.

As has been described, the magnetic head according to the present embodiment includes the medium facing surface 2, the read head unit 8, and the write head unit 9. The medium facing surface 2 faces the recording medium. The read head unit 8 and the write head unit 9 are stacked on the substrate 1. Relative to the write head unit 9, the read head unit 8 is disposed backward along the direction T of travel of the recording medium (i.e., on the leading end side).

The read head unit 8 includes: the MR element 5 serving as a read element; the first read shield layer 3 and the second read shield layer 7 for shielding the MR element 5, with their respective portions near the medium facing surface 2 opposed to each other with the MR element 5 therebetween; the first read shield gap film 4 disposed between the MR element 5 and the first read shield layer 3; and the second read shield gap film 6 disposed between the MR element 5 and the second read shield layer 7.

The write head unit 9 includes the coil 10, the main pole 15, the write shield 16, the gap part 17, the yoke layers 31 and 41, the first coupling part 44, the second coupling part 34, and the magnetic layers 32, 42, and 43. The write shield 16 includes the first shield 16A, the two side shields 16C and 16D, and the second shield 16B. The gap part 17 includes the first gap layer 18 and the second gap layer 19.

The yoke layers 31 and 41 are aligned along the direction T of travel of the recording medium such that the main pole 15 is interposed between the yoke layers 31 and 41. The yoke layer 31 is disposed backward of the main pole 15 along the direction T of travel of the recording medium. The yoke layer 41 is disposed forward of the main pole 15 along the direction T of travel of the recording medium. The yoke layer 41 is magnetically connected to the first shield 16A of the write shield 16 via the magnetic layer 42. In the main cross section, the yoke layer 41 is greater than the first shield 16A in length in the direction perpendicular to the medium facing surface 2.

The yoke layer 31 is magnetically connected to the second shield 16B of the write shield 16 via the magnetic layer 32. The magnetic layer 32 has an end face that is located in the medium facing surface 2 at a position backward of the end face of the second shield 16B along the direction T of travel of the recording medium. In the main cross section, the yoke layer 31 is greater than the second shield 16B in length in the direction perpendicular to the medium facing surface 2. In the main cross section, the magnetic layer 32 is greater than the second shield 16B and smaller than the yoke layer 31 in length in the direction perpendicular to the medium facing surface 2.

The first coupling part 44 (the magnetic layer 45) and the magnetic layer 43 magnetically couple the main pole 15 and the yoke layer 41 to each other. The second coupling part 34 (the magnetic layers 35 to 39) magnetically couples the yoke layer 31 and the yoke layer 41 to each other.

The coil 10 includes the winding portion 10A of planar spiral shape. The winding portion 10A is wound around the first coupling part (the magnetic layer 45), and a part of the winding portion 10A passes between the first coupling part 44 (the magnetic layer 45) and the second coupling part 34 (the magnetic layer 39).

The magnetic head further includes the heater 82, the expansion layer 84, the sensor 85, and the nonmagnetic part 86. The expansion layer 84, the sensor 85, and the nonmagnetic part 86 are disposed between the read head unit 8 and the write head unit 9. Relative to the expansion layer 84 and the sensor 85, the heater 82 is located backward along the direction T of travel of the recording medium (i.e., on the leading end side). The nonmagnetic part 86 is disposed around the expansion layer 84 and the sensor 85.

The heater 82, the expansion layer 84 and the sensor 85 will be described in detail below. First, a description will be given of the heater 82 and the expansion layer 84. The heater 82 and the expansion layer 84 are provided to make the medium facing surface 2 protrude in part so as to reduce the distance from the read head unit 8 and the write head unit 9 to the surface of the recording medium. The heater 82 generates heat for causing the medium facing surface 2 to protrude in part. The expansion layer 84 expands with the heat generated by the heater 82, and thereby makes part of the medium facing surface 2 protrude.

The heater 82 is made of a conductive material, such as metal, which generates heat by being energized. For example, the heater 82 is formed of a film of NiCr or a layered film consisting of Ta, NiCu, and Ta films.

The expansion layer 84 is made of a material that has a higher thermal conductivity and a higher coefficient of linear thermal expansion than those of the material of the nonmagnetic part 86. If the nonmagnetic part 86 is made of alumina, the expansion layer 84 needs to be made of a material that has a higher thermal conductivity and a higher coefficient of linear thermal expansion than those of alumina. At 25° C., alumina has a thermal conductivity of around 30 W/m·K. In the range of 25° C. to 100° C., alumina has a coefficient of linear thermal expansion of around $6.5 \times 10^{-6}/°$ C. The expansion layer 84 may be made of a metal material. The metal material to form the expansion layer 84 may be either a nonmagnetic metal material or a magnetic metal material. Examples of nonmagnetic metal materials that can be used to form the expansion layer 84 include Al, Cu, and Au. Examples of magnetic metal materials that can be used to form the expansion layer 84 include CoFeN, CoNiFe, NiFe, and CoFe.

A description will now be given of a method for reducing the distance from the read head unit 8 and the write head unit 9 to the surface of the recording medium by using the heater 82 and the expansion layer 84. An electric current of predetermined magnitude is passed through the heater 82. This causes the heater 82 to generate heat for making part of the medium facing surface 2 protrude.

The components of the magnetic head expand with the heat generated by the heater 82. In particular, the expansion layer 84 is made of a material that has a thermal conductivity higher than that of the material of the nonmagnetic part 86 surrounding the expansion layer 84. The heat generated by the heater 82 is therefore distributed within the expansion layer 84 more rapidly and uniformly than in the nonmagnetic part 86. Furthermore, the material of the expansion layer 84 has a coefficient of linear thermal expansion higher than that of the material of the nonmagnetic part 86. With the heat generated by the heater 82, the expansion layer 84 therefore expands more rapidly and greatly than the nonmagnetic part 86 does, thereby making part of the medium facing surface 2 protrude. This reduces the distance from the read head unit 8 and the write head unit 9 to the surface of the recording medium. The amount of protrusion of the part of the medium facing surface 2 can be adjusted by adjusting the magnitude of the electric current passed through the heater 82.

Next, the sensor 85 will be described. The sensor 85 is intended to detect contact of part of the medium facing surface 2 with the recording medium. The sensor 85 is a resistor that varies in resistance with a change in its own temperature when part of the medium facing surface 2 makes contact with the recording medium. The sensor 85 is made of a metal material or a semiconductor material that varies in resistance at a considerable rate with respect to a change in temperature, i.e., that has a considerable temperature coefficient of resistance. Specific examples of the material of the sensor 85 include NiFe, W, Cu, Ni, and Pt.

When part of the medium facing surface 2 comes into contact with the recording medium, the frictional heat resulting from the contact raises the temperature of the medium facing surface 2 at and in the vicinity of the part in contact with the recording medium. Such a rise in temperature also raises the temperature of the sensor 85 itself. As a result, the sensor 85 varies in resistance. The resistance of the sensor 85 can thus be measured to detect the contact of part of the medium facing surface 2 with the recording medium.

The shape of the main pole 15 will now be described in detail with reference to FIG. 4. As shown in FIG. 4, the main pole 15 includes a track width defining portion 15A and a wide portion 15B. The track width defining portion 15A has an end face located in the medium facing surface 2, and an end opposite to the end face. The wide portion 15B is connected to the end of the track width defining portion 15A. As shown in FIG. 4, the main pole 15 has: the bottom end 15L which is the end closer to the top surface 1a of the substrate 1; the top surface 15T opposite to the bottom end 15L; the first side part SP1; and the second side part SP2. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 2. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 2, then becoming constant. Here, the length of the track width defining portion 15A in the direction perpendicular to the medium facing surface 2 will be referred to as neck height. The neck height falls within the range of 0 to 0.3 µm, for example. A zero neck height means that no track width defining portion 15A exists and an end face of the wide portion 15B is thus located in the medium facing surface 2.

The bottom end 15L includes a first portion 15L1, a second portion 15L2, and a third portion 15L3 that are contiguously arranged in order of increasing distance from the medium facing surface 2. The first portion 15L1 has an end located in the medium facing surface 2. Each of the first and second portions 15L1 and 15L2 may be an edge formed by two intersecting planes, or may be a plane connecting two planes to each other. The third portion 15L3 is a plane extending in a direction substantially perpendicular to the medium facing surface 2. The top surface 15T includes a fourth portion 15T1, a fifth portion 15T2, and a sixth portion 15T3 that are contiguously arranged in order of increasing distance from the medium facing surface 2. The fourth portion 15T1 has an end located in the medium facing surface 2.

The distance from the top surface 1a of the substrate 1 to any given point on each of the first and second portions 15L1 and 15L2 decreases with increasing distance from the given point to the medium facing surface 2. The angle of inclination of the second portion 15L2 with respect to the direction perpendicular to the medium facing surface 2 is greater than the angle of inclination of the first portion 15L1 with respect to the direction perpendicular to the medium facing surface 2. The second shield 16B has a top surface that is opposed to the first and second portions 15L1 and 15L2 with the gap part 17 (the first gap layer 18) interposed therebetween. The distance from the top surface 1a of the substrate 1 to any given point on the top surface of the second shield 16B decreases with increasing distance from the given point to the medium facing surface 2.

The distance from the top surface 1a of the substrate 1 to any given point on each of the fourth and fifth portions 15T1 and 15T2 increases with increasing distance from the given point to the medium facing surface 2. The angle of inclination of the fifth portion 15T2 with respect to the direction perpendicular to the medium facing surface 2 is greater than the angle of inclination of the fourth portion 15T1 with respect to the direction perpendicular to the medium facing surface 2. The sixth portion 15T3 extends in the direction substantially perpendicular to the medium facing surface 2. The first shield 16A has a bottom surface that is opposed to the fourth and fifth portions 15T1 and 15T2 with the gap part 17 (the second gap layer 19) interposed therebetween. The distance from the top surface 1a of the substrate 1 to any given point on the bottom surface of the first shield 16A increases with increasing distance from the given point to the medium facing surface 2.

Both the angle of inclination of the first portion 15L1 and the angle of inclination of the fourth portion 15T1 preferably fall within the range of 15° to 45°. Both the angle of inclination of the second portion 15L2 and the angle of inclination of the fifth portion 15T2 preferably fall within the range of 45° to 85°.

As shown in FIG. 4, the end face of the main pole 15 located in the medium facing surface 2 has a first side A1 adjacent to the second gap layer 19, a second side A2 connected to a first end of the first side A1, and a third side A3 connected to a second end of the first side A1. The first side A1 defines the track width. The position of an end of a record bit to be recorded on the recording medium depends on the position of the first side A1. The end face of the main pole 15 located in the medium facing surface 2 decreases in width in the track width direction TW with increasing proximity to the bottom end 15L of the main pole 15, that is, with increasing proximity to the top surface 1a of the substrate 1. Each of the second side A2 and the third side A3 is at an angle in the range of, for example, 7° to 17°, or preferably in the range of 10° to 15°, with respect to the direction perpendicular to the top surface of the substrate 1. The first side A1 has a length in the range of 0.05 to 0.20 µm, for example.

The thickness (length in the direction perpendicular to the top surface 1a of the substrate 1) of the main pole 15 at the medium facing surface 2 falls within the range of 0.05 to 0.2 µm, for example. The distance between the third portion 15L3 and the sixth portion 15T3 falls within the range of 0.4 to 0.8 µm, for example.

FIG. 4 shows an example where the distance from the medium facing surface 2 to the boundary between the second portion 15L2 and the third portion 15L3, and the distance from the medium facing surface 2 to the boundary between the fifth portion 15T2 and the sixth portion 15T3, are both equal to the neck height, i.e., the distance from the medium facing surface 2 to the boundary between the track width defining portion 15A and the wide portion 15B. Nevertheless, the distance from the medium facing surface 2 to the boundary between the second portion 15L2 and the third portion 15L3, and the distance from the medium facing surface 2 to the boundary between the fifth portion 15T2 and the sixth portion 15T3, may each be smaller or greater than the neck height.

The function and effects of the magnetic head according to the present embodiment will now be described. In the magnetic head, the write head unit 9 writes data on the recording medium, and the read head unit 8 reads data written on the recording medium. In the write head unit 9, the coil 10 produces a magnetic field corresponding to data to be written on the recording medium. The main pole 15 allows a magnetic flux corresponding to the magnetic field produced by the coil 10 to pass, and produces a write magnetic field for writing data on the recording medium by means of the perpendicular magnetic recording system.

The write shield 16 captures a disturbance magnetic field applied to the magnetic head from the outside thereof. This allows preventing erroneous writing on the recording medium induced by the disturbance magnetic field intensively captured into the main pole 15. The write shield 16 also functions to capture a magnetic flux that is produced from the end face of the main pole 15 and that expands in directions other than the direction perpendicular to the plane of the recording medium, and to thereby prevent the magnetic flux from reaching the recording medium.

Furthermore, the write shield 16, the yoke layers 31 and 41, the first coupling part 44, the second coupling part 34, and the magnetic layers 32, 42 and 43 function to allow a magnetic flux that has been produced from the end face of the main pole 15 and has magnetized the recording medium to flow back. More specifically, a part of the magnetic flux that has been produced from the end face of the main pole 15 and has magnetized the recording medium flows back to the main pole 15 through the write shield 16, the magnetic layer 42, the yoke layer 41, the first coupling part 44 (the magnetic layer 45), and the magnetic layer 43. Another part of the magnetic flux that has been produced from the end face of the main pole 15 and has magnetized the recording medium flows back to the main pole 15 through the write shield 16, the magnetic layer 32, the yoke layer 31, the second coupling part 34 (the magnetic layers 35 to 39), the yoke layer 41, the first coupling part 44, and the magnetic layer 43. Thus, according to the present embodiment, there are formed first and second magnetic paths that lead from the write shield 16 to the main pole 15. The first magnetic path passes through the yoke layer 41 and the first coupling part 44. The second magnetic path passes through the yoke layer 31, the second coupling part 34, the yoke layer 41, and the first coupling part 44.

The write shield 16 includes the first shield 16A, the second shield 16B, and the two side shields 16C and 16D. The present embodiment thus makes it possible that, in regions both backward and forward of the end face of the main pole 15 along the direction T of travel of the recording medium and regions on opposite sides of the end face of the main pole 15 in the track width direction TW, a magnetic flux that is produced from the end face of the main pole 15 and expands in directions other than the direction perpendicular to the plane of the recording medium can be captured and thereby prevented from reaching the recording medium. Consequently, the present embodiment allows preventing the skew-induced adjacent track erase. The first shield 16A and the second shield 16B contribute to an increase in the gradient of the write magnetic field, as well as the prevention of the skew-induced adjacent track erase. The side shields 16C and 16D greatly contribute to the prevention of adjacent track erase, in particular. According to the present embodiment, such functions of the write shield 16 serve to increase the recording density.

Furthermore, as shown in FIG. 4, the present embodiment is configured so that in the medium facing surface 2, the distance between the first and second side parts SP1 and SP2 of the main pole 15 in the track width direction TW, i.e., the width of the end face of the main pole 15, decreases with increasing proximity to the top surface 1a of the substrate 1. According to the present embodiment, this feature also serves to prevent the skew-induced adjacent track erase.

The present embodiment is also configured so that in the medium facing surface 2, the distance between the first and second sidewalls of the side shields 16C and 16D in the track width direction TW decreases with increasing proximity to the top surface 1a of the substrate 1, as does the distance between the first and second side parts SP1 and SP2 of the main pole 15. The present embodiment thus makes it possible that the distance between the first side part SP1 and the first sidewall and the distance between the second side part SP2 and the second sidewall are both small and constant in the medium facing surface 2. This configuration allows the side shields 16C and 16D to effectively capture the magnetic flux that is produced from the end face of the main pole 15 and expands to opposite sides in the track width direction TW. As a result, the present embodiment can enhance the function of the side shields 16C and 16D in particular, and thereby prevent the skew-induced adjacent track erase more effectively.

For effective functioning of the write shield 16, it is important for the write shield 16 to be able to capture a lot of magnetic flux. The provision of the magnetic head with the first and second magnetic paths leading from the write shield 16 to the main pole 15 as in the present embodiment is thus effective.

Now, a description will be made as to the role of the magnetic layer 32. First, suppose a case where the magnetic layer 32 is not provided and thus the second shield 16B and the yoke layer 31 are not magnetically coupled to each other. In this case, the magnetic flux that has been captured by the second shield 16B or the side shields 16C and 16D and directed downward cannot flow toward the yoke layer 31, and thus returns so as to proceed upward. This causes the second shield 16B or the side shields 16C and 16D to produce upwardly and downwardly directed magnetic fluxes. As a result, part of the magnetic flux captured by the second shield 16B or the side shields 16C and 16D leaks out of the medium facing surface 2. This may cause adjacent track erase. In contrast to this, if the second shield 16B and the yoke layer 31 are magnetically coupled to each other by the magnetic layer 32, the magnetic flux captured by the side shields 16C and 16D is divided to flow upward and downward, and the magnetic flux captured by the second shield 16B is mainly directed downward. This can prevent the adjacent track erase that may be caused by part of the magnetic flux captured by the second shield 16B or the side shields 16C and 16D being leaked out of the medium facing surface 2.

If the second shield 16B is excessively long in the direction perpendicular to the medium facing surface 2 in the main cross section, flux leakage from the main pole 15 to the second shield 16B increases and the main pole 15 thus becomes unable to direct much magnetic flux to the medium facing surface 2. It is therefore necessary that the second shield 16B is not excessively long in the direction perpendicular to the medium facing surface 2 in the main cross section. In the main cross section, if the length of the magnetic layer 32 in the direction perpendicular to the medium facing surface 2 is equal to or smaller than that of the second shield 16B, the magnetic layer 32 cannot direct much magnetic flux from the second shield 16B to the yoke layer 31. In contrast to this, the present embodiment is configured so that in the main cross section the magnetic layer 32 is greater than the second shield 16B and smaller than the yoke layer 31 in length in the direction perpendicular to the medium facing surface 2. Consequently, the present embodiment allows the magnetic layer 32 to direct much magnetic flux from the second shield 16B to the yoke layer 31.

Figure 5:
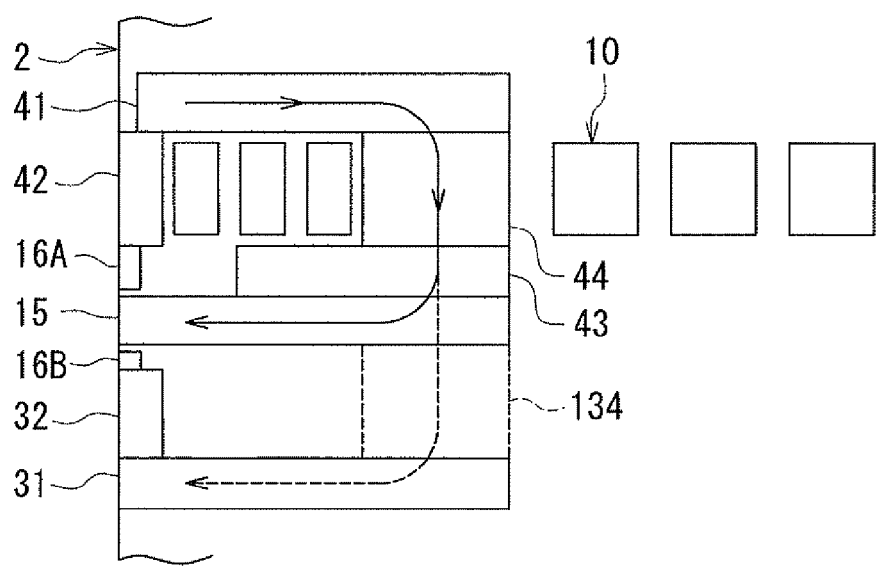
FIG. 5 is an explanatory diagram showing the flow of magnetic flux in a first comparative example.
Figure 6:
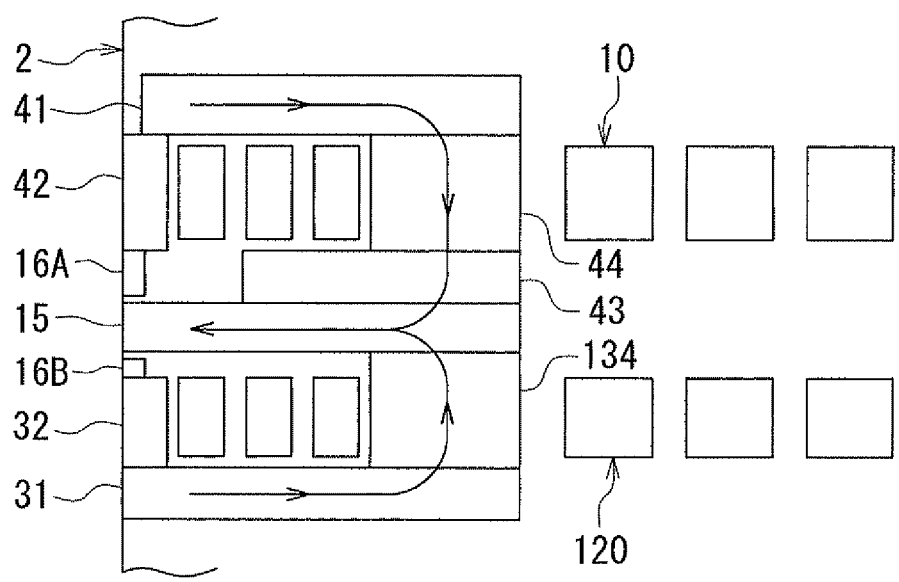
FIG. 6 is an explanatory diagram showing the flow of magnetic flux in a second comparative example.
Figure 7:
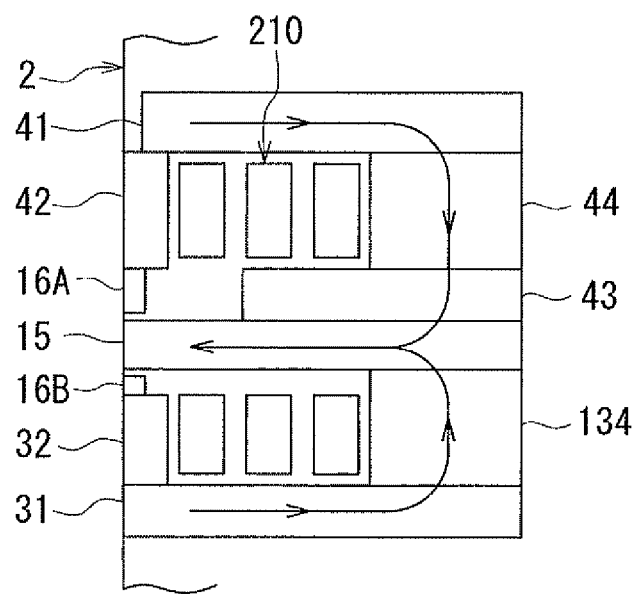
FIG. 7 is an explanatory diagram showing the flow of magnetic flux in a third comparative example.
Figure 8:
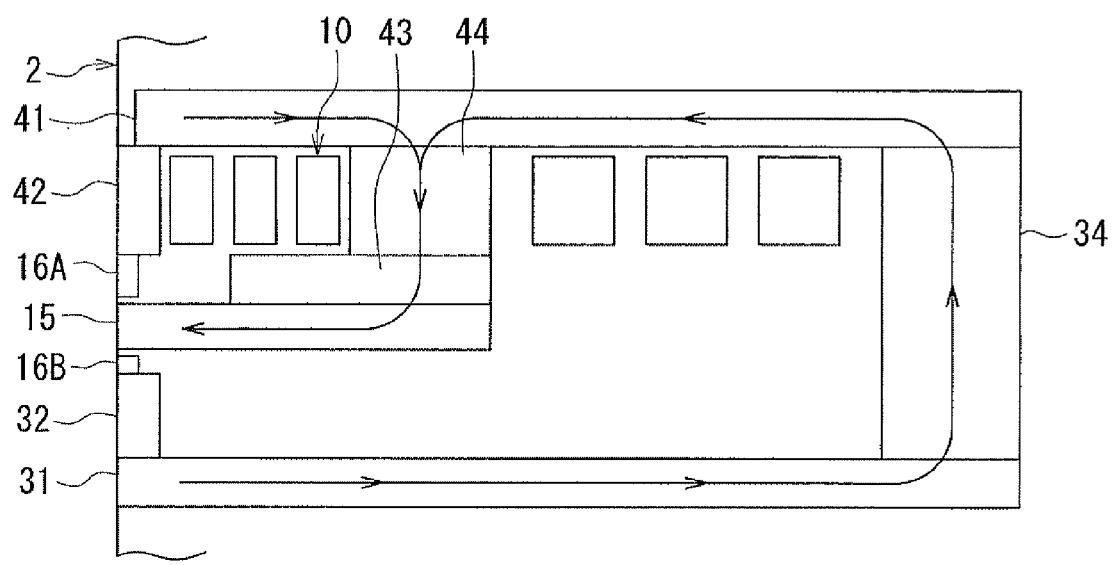
FIG. 8 is an explanatory diagram showing the flow of magnetic flux in the magnetic head according to the first embodiment of the invention.

According to the present embodiment, it is possible to simplify the structure of the coil 10 while providing the first and second magnetic paths that lead from the write shield 16 to the main pole 15. This will now be described with reference to FIG. 5 to FIG. 8. FIG. 5 is an explanatory diagram showing the flow of magnetic flux in a first comparative example. FIG. 6 is an explanatory diagram showing the flow of magnetic flux in a second comparative example. FIG. 7 is an explanatory diagram showing the flow of magnetic flux in a third comparative example. FIG. 8 is an explanatory diagram showing the flow of magnetic flux in the magnetic head according to the present embodiment. In FIG. 5 to FIG. 8, the components of the magnetic head are depicted in a simplified form. The arrows in FIG. 5 to FIG. 8 represent the flow of magnetic flux.

First, a magnetic head of the first comparative example will be described. The magnetic head of the first comparative example is without the second coupling part 34 of the present embodiment that magnetically couples the yoke layers 31 and 41 to each other. The magnetic head of the first comparative example may or may not have a coupling part 134 that magnetically couples the yoke layer 31 and the main pole 15 to each other. The remainder of configuration of the magnetic head of the first comparative example is the same as that of the magnetic head according to the present embodiment.

In the first comparative example, there is no coil between the yoke layer 31 and the main pole 15. Consequently, in the yoke layer 31, there occurs no magnetic flux, or there occurs, due to the magnetomotive force of the coil 10, a magnetic flux that flows through the yoke layer 31 in a direction opposite to the direction of flow of the magnetic flux in the yoke layer 41, as shown by the broken line. In the former case, the yoke layer 31 fails to function as a magnetic path that leads from the write shield 16 to the main pole 15. In the latter case, the magnetic fluxes flow through the main pole 15 and the yoke layer 31 in the same direction, causing magnetic fields to occur in the same direction from the end face of the main pole 15 and from the end face of the yoke layer 31 in the medium facing surface 2. This might result in adjacent track erase.

In contrast, in the present embodiment, as shown in FIG. 8, the magnetomotive force of the coil 10 generates a magnetic flux that passes through the first magnetic path and a magnetic flux that passes through the second magnetic path so that the magnetic fluxes meet in the first coupling part 44. The magnetic fluxes flow through the yoke layers 31 and 41 in a direction opposite to the direction of flow in the main pole 15. The present embodiment thus allows the write shield 16 to function effectively.

Next, a magnetic head of the second comparative example will be described. The magnetic head of the second comparative example is formed by adding a coil 120 of planar spiral shape to the magnetic head of the first comparative example having the coupling part 134. The coil 120 is wound around the coupling part 134. The coil 10 and the coil 120 are connected in series or in parallel.

In the second comparative example, as shown in FIG. 6, the magnetomotive force of the coil 10 generates a magnetic flux that passes through a magnetic path leading through the yoke layer 41 and the first coupling part 44. On the other hand, the magnetomotive force of the coil 120 generates a magnetic flux that passes through a magnetic path leading through the yoke layer 31 and the coupling part 134. The main pole 15 allows both the magnetic flux generated by the magnetomotive force of the coil 10 and the magnetic flux generated by the magnetomotive force of the coil 120 to pass. The magnetic fluxes flow through the yoke layers 31 and 41 in a direction opposite to the direction of flow in the main pole 15.

Having the two coils 10 and 120 of planar spiral shape corresponding to the two magnetic paths, the magnetic head of the second comparative example has the problem that the structure of the coils 10 and 120 and the structure in the vicinity of the coils 10 and 120 are complicated and a large number of steps are needed for the formation of the coils 10 and 120.

In contrast, according to the present embodiment, the magnetomotive force of the single coil 10 can generate the magnetic flux that passes through the first magnetic path and the magnetic flux that passes through the second magnetic path so that the magnetic fluxes meet in the first coupling part 44. The magnetic head according to the present embodiment thus provides a simplified coil structure while providing the first and second magnetic paths that lead from the write shield 16 to the main pole 15. This prevents the occurrence of the foregoing problem of the second comparative example.

Next, a magnetic head of the third comparative example will be described. The magnetic head of the third comparative example includes a coil 210 of helical shape wound around the main pole 15, instead of the coils 10 and 120 of the magnetic head of the second comparative example. In the third comparative example, as shown in FIG. 7, the magnetomotive force of the coil 210 generates a magnetic flux that passes through the magnetic path leading through the yoke layer 41 and the first coupling part 44 and a magnetic flux that passes through the magnetic path leading through the yoke layer 31 and the coupling part 134. The main pole 15 allows these magnetic fluxes generated by the magnetomotive force of the coil 210 to pass. The magnetic fluxes flow through the yoke layers 31 and 41 in a direction opposite to the direction of flow in the main pole 15.

Having the coil 210 of helical shape wound around the main pole 15, the magnetic head of the third comparative example has the problem that the structure of the coil 210 and the structure in the vicinity of the coil 210 are complicated and a large number of steps are needed for the formation of the coil 210.

In contrast, as mentioned above, the magnetic head according to the present embodiment provides a simplified coil structure while providing the first and second magnetic paths that lead from the write shield 16 to the main pole 15. This prevents the occurrence of the foregoing problem of the third comparative example.

As has been described, the magnetic head according to the present embodiment makes it possible to simplify the structure of the coil 10 and allow the write shield 16 to function effectively, while providing the first and second magnetic paths that lead from the write shield 16 to the main pole 15.

In the present embodiment, there is no coil between the read head unit 8 and the main pole 15. According to the present embodiment, it is therefore possible to reduce the distance between the read head unit 8 and the main pole 15 as compared with the second and third comparative examples where at least part of a coil exists between the read head unit 8 and the main pole 15.

Now, suppose a configuration where the second coupling part 34 lies between the coil 10 and the medium facing surface 2. Such a configuration increases the distance between the first coupling part 44 and the medium facing surface 2, and may thereby lower the rate of change in the direction of the magnetic flux that occurs from the end face of the main pole 15. In the present embodiment, the second coupling part 34 is located in a position other than between the coil 10 and the medium facing surface 2. Consequently, the present embodiment makes it possible to reduce the distance between the first coupling part 44 and the medium facing surface 2 and to thereby increase the rate of change in the direction of the magnetic flux that occurs from the end face of the main pole 15.

The other effects provided by the present embodiment will now be described. In the present embodiment, the bottom end 15L of the main pole 15 includes the first portion 15L1, the second portion 15L2, and the third portion 15L3 that are contiguously arranged in order of increasing distance from the medium facing surface 2. The top surface 15T of the main pole 15 includes the fourth portion 15T1, the fifth portion 15T2, and the sixth portion 15T3 that are contiguously arranged in order of increasing distance from the medium facing surface 2. The distance from the top surface 1a of the substrate 1 to any given point on each of the first and second portions 15L1 and 15L2 decreases with increasing distance from the given point to the medium facing surface 2. The distance from the top surface 1a of the substrate 1 to any given point on each of the fourth and fifth portions 15T1 and 15T2 increases with increasing distance from the given point to the medium facing surface 2. Consequently, the present embodiment allows the main pole 15 to have a small thickness in the medium facing surface 2. It is thus possible to prevent the skew-induced adjacent track erase. The present embodiment further allows the main pole 15 to have a great thickness in the part away from the medium facing surface 2. This allows the main pole 15 to direct much magnetic flux to the medium facing surface 2, and consequently allows improving write characteristics such as overwrite property.

In the main pole 15 of the present embodiment, the angles of inclination of the first and fourth portions 15L1 and 15T1 can be reduced to thereby suppress variations in write characteristics associated with changes in level of the medium facing surface 2. Furthermore, in the main pole 15, the angles of inclination of the second and fifth portions 15L2 and 15T2 can be increased to thereby provide a great distance between the third portion 15L3 and the sixth portion 15T3 while achieving a small thickness of the main pole 15 in the medium facing surface 2. This allows preventing the skew-induced problems and improving write characteristics. Consequently, according to the present embodiment, it is possible to prevent the skew-induced problems and to improve write characteristics while suppressing variations in write characteristics associated with changes in level of the medium facing surface 2.

Second Embodiment

Figure 9:
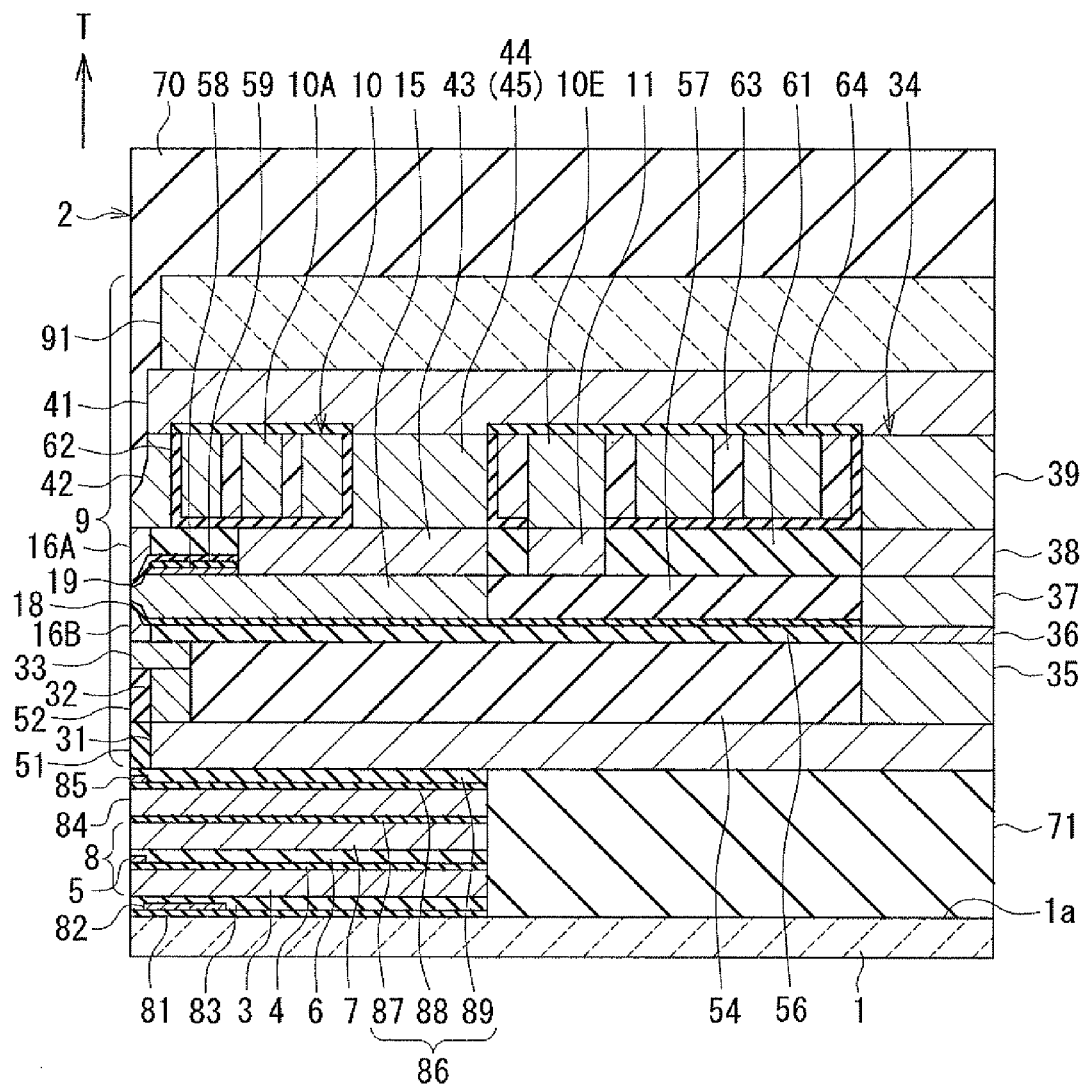
FIG. 9 is a cross-sectional view of a magnetic head according to a second embodiment of the invention.

A magnetic head according to a second embodiment of the invention will now be described with reference to FIG. 9. FIG. 9 is a cross-sectional view of the magnetic head according to the present embodiment. FIG. 9 shows a cross section perpendicular to the medium facing surface and the top surface of the substrate, or the main cross section, in particular.

The magnetic head according to the present embodiment is different from the magnetic head according to the first embodiment in the following respects. In the present embodiment, the yoke layer 31 and the magnetic layer 32 have their respective end faces facing toward the medium facing surface 2, and these end faces are located at a distance from the medium facing surface 2. The magnetic head has an insulating layer 51 disposed over the insulating layer 71 and the nonmagnetic layer 89 around the yoke layer 31. Part of the insulating layer 51 is interposed between the medium facing surface 2 and the aforementioned end face of the yoke layer 31. The magnetic head further has an insulating layer 52 made of an insulating material and interposed between the medium facing surface 2 and the aforementioned end face of the magnetic layer 32.

In the present embodiment, the write head unit 9 has a magnetic layer 33 made of a magnetic material and disposed between the magnetic layer 32 and the second shield 16B. In the present embodiment, the top surfaces of the magnetic layers 33 and 35 and the insulating layer 54 are even with each other. The magnetic layers 33 and 32 magnetically couple the second shield 16B of the write shield 16 and the yoke layer 31 to each other. Examples of materials that can be used for the magnetic layer 33 include CoFeN, CoNiFe, NiFe, and CoFe.

The magnetic layer 33 has an end face that is located in the medium facing surface 2 at a position backward of the end face of the second shield 16B along the direction T of travel of the recording medium. In the main cross section, the magnetic layer 33 is greater than the second shield 16B and smaller than the yoke layer 31 in length in the direction perpendicular to the medium facing surface 2.

The remainder of configuration, function and effects of the present embodiment are similar to those of the first embodiment.

Third Embodiment

Figure 10:
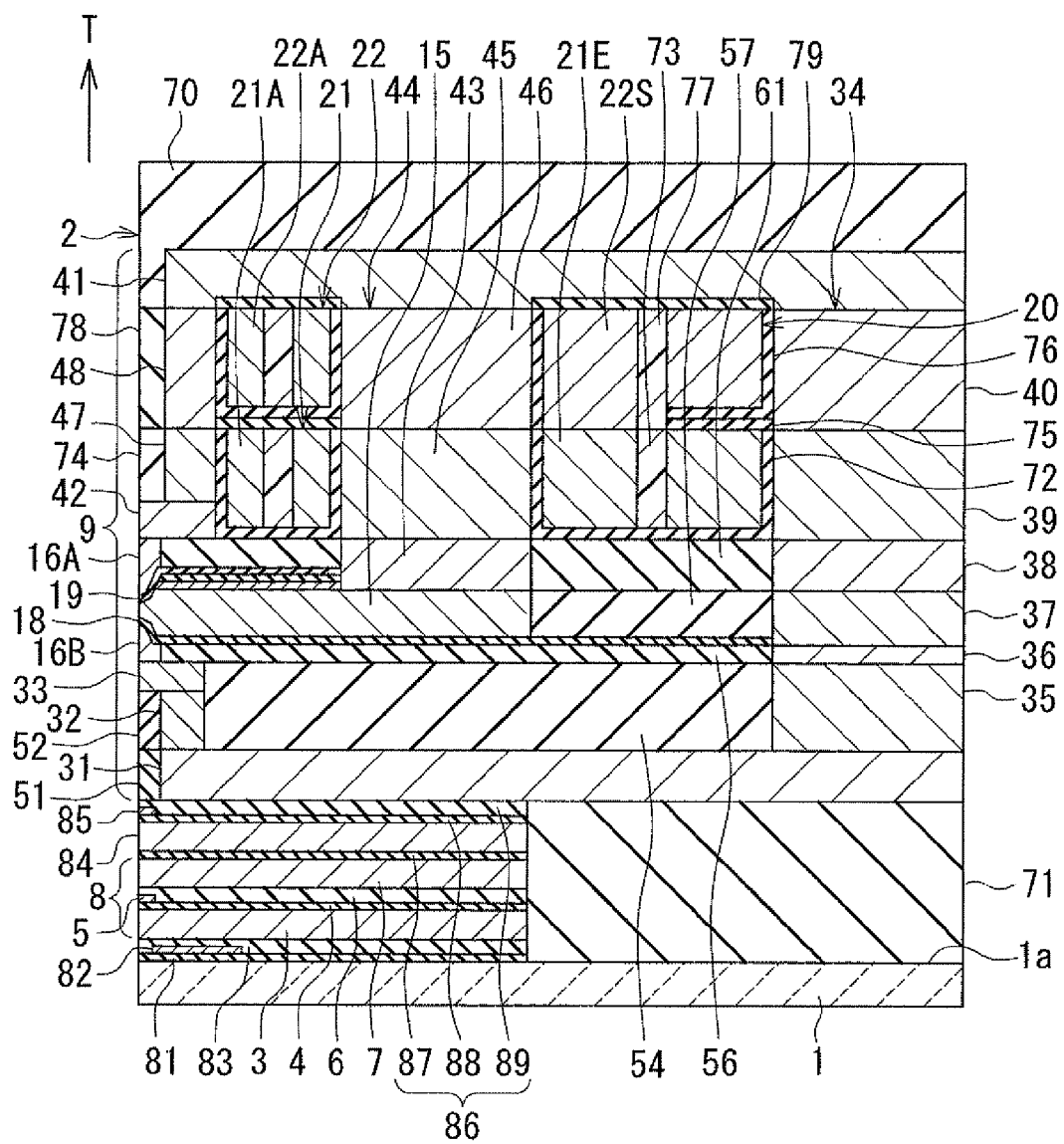
FIG. 10 is a cross-sectional view of a magnetic head according to a third embodiment of the invention.
Figure 11:
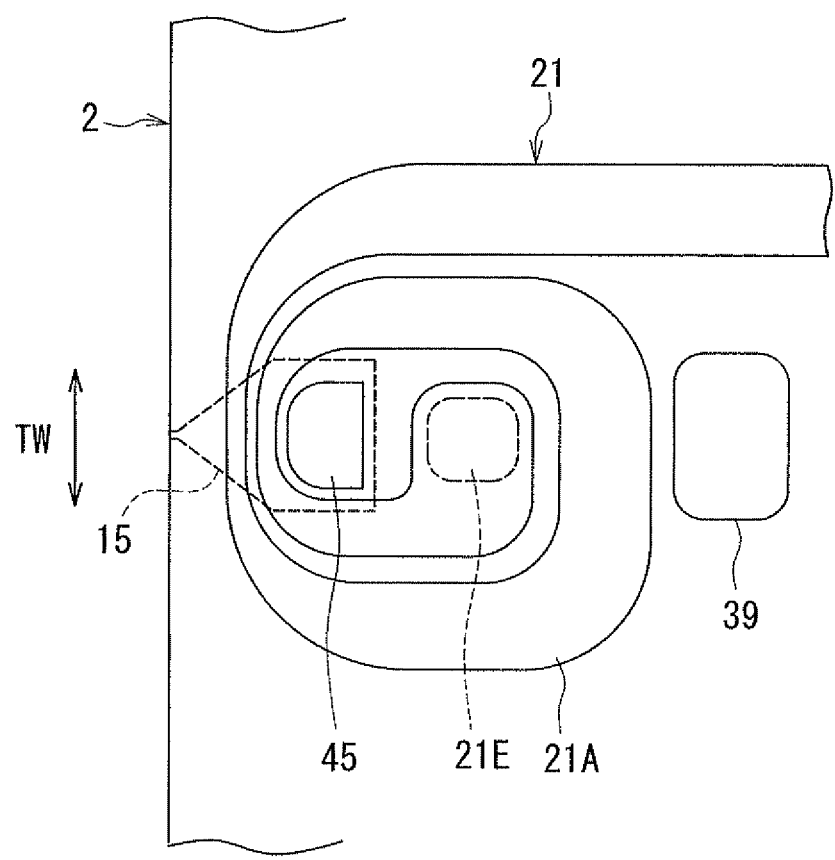
FIG. 11 is a plan view showing a first layer of a coil of the magnetic head according to the third embodiment of the invention.
Figure 12:
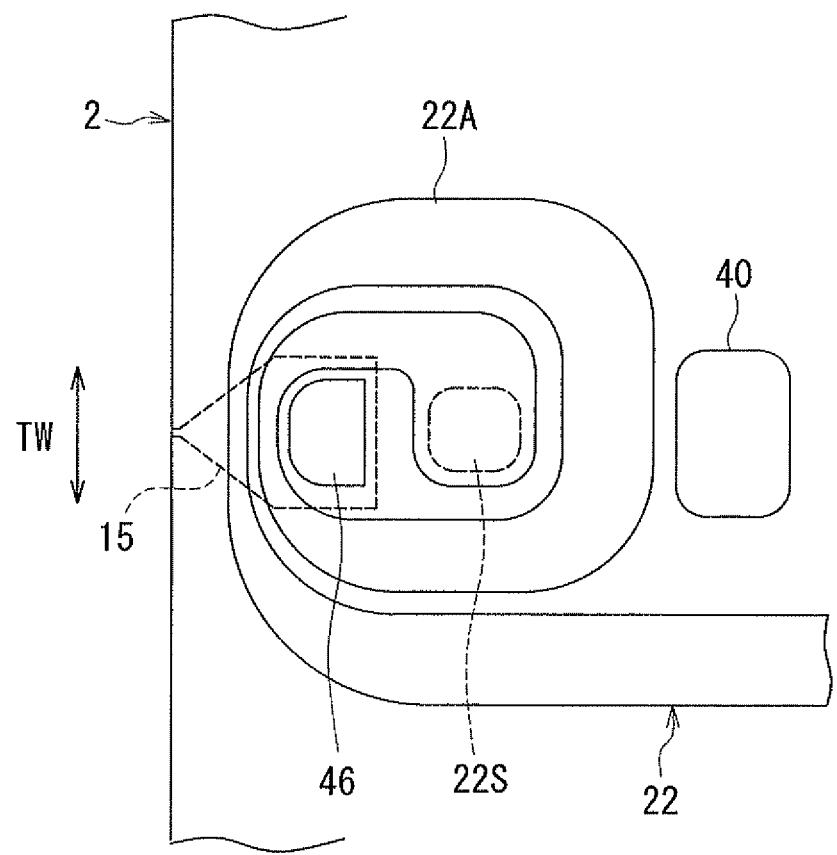
FIG. 12 is a plan view showing a second layer of the coil of the magnetic head according to the third embodiment of the invention.

A magnetic head according to a third embodiment of the invention will now be described with reference to FIG. 10 to FIG. 12. FIG. 10 is a cross-sectional view of the magnetic head according to the present embodiment. FIG. 10 shows a cross section perpendicular to the medium facing surface and the top surface of the substrate, or the main cross section, in particular. FIG. 11 is a plan view showing a first layer of the coil of the magnetic head according to the present embodiment. FIG. 12 is a plan view showing a second layer of the coil of the magnetic head according to the present embodiment.

The magnetic head according to the present embodiment is different from the magnetic head according to the second embodiment in the following respects. In the present embodiment, the first coupling part 44 includes a magnetic layer 46 in addition to the magnetic layer 45. The magnetic layer 46 is disposed on the magnetic layer 45. The second coupling part 34 includes a magnetic layer 40 in addition to the magnetic layers 35 to 39. The magnetic layer 40 is disposed on the magnetic layer 39. The write head unit 9 has magnetic layers 47 and 48 that are made of a magnetic material and stacked in this order on the magnetic layer 42. The magnetic layers 47 and 48 have their respective end faces facing toward the medium facing surface 2, and these end faces are located at a distance from the medium facing surface 2. Examples of materials that can be used for the magnetic layers 47 and 48 include CoFeN, CoNiFe, NiFe, and CoFe.

In the present embodiment, the write head unit 9 has a coil 20 instead of the coil 10. The coil 20 includes a first layer 21 and a second layer 22 connected in series. As shown in FIG. 11, the first layer 21 includes a winding portion 21A of planar spiral shape. The winding portion 21A is wound around the first coupling part 44 (the magnetic layer 45), and a part of the winding portion 21A passes between the first coupling part 44 (the magnetic layer 45) and the second coupling part 34 (the magnetic layer 39). In FIG. 10 and FIG. 11, the reference symbol 21E indicates a coil connection part of the first layer 21 connected to the second layer 22. In the example shown in FIG. 11, the winding portion 21A is wound approximately two turns around the first coupling part 44 (the magnetic layer 45).

As shown in FIG. 12, the second layer 22 includes a winding portion 22A of planar spiral shape. The winding portion 22A is wound around the first coupling part 44 (the magnetic layer 46), and a part of the winding portion 22A passes between the first coupling part 44 (the magnetic layer 46) and the second coupling part 34 (the magnetic layer 40). In FIG. 10 and FIG. 12, the reference symbol 22S indicates a coil connection part of the second layer 22 connected to the coil connection part 21E of the first layer 21. In the example shown in FIG. 12, the winding portion 22A is wound approximately two turns around the first coupling part 44 (the magnetic layer 46).

The magnetic head according to the present embodiment has: an insulating layer 72 made of an insulating material and interposed between the first layer 21 of the coil 20 and each of the magnetic layers 39, 42, 45 and 47 and the nonmagnetic layer 61; an insulating layer 73 made of an insulating material and disposed in the space between adjacent turns of the first layer 21; an insulating layer 74 made of an insulating material and disposed around the magnetic layers 39, 42 and 47 and the insulating layer 72; and an insulating layer 75 made of an insulating material and disposed to cover the first layer 21 and the insulating layers 72 and 73. The insulating layer 75 has an opening for exposing the top surface of the coil connection part 21E of the first layer 21. The top surfaces of the first layer 21, the magnetic layers 39, 45 and 47 and the insulating layers 73 and 74 are even with each other. The insulating layers 72, 74 and 75 are made of alumina, for example. The insulating layer 73 is made of photoresist, for example.

The magnetic head according to the present embodiment further has: an insulating layer 76 made of an insulating material and interposed between the second layer 22 of the coil 20 and each of the magnetic layers 40, 46 and 48 and the insulating layer 75; an insulating layer 77 made of an insulating material and disposed in the space between adjacent turns of the second layer 22; an insulating layer 78 made of an insulating material and disposed around the magnetic layers 40 and 48 and the insulating layer 76; and an insulating layer 79 made of an insulating material and disposed to cover the second layer 22 and the insulating layers 76 and 77. The insulating layer 76 has an opening for exposing the top surface of the coil connection part 21E of the first layer 21. The coil connection part 22S of the second layer 22 is electrically connected to the coil connection part 21E through the openings formed in the insulating layers 75 and 76. The top surfaces of the second layer 22, the magnetic layers 40, 46 and 48 and the insulating layers 77 and 78 are even with each other. The insulating layers 76, 78 and 79 are made of alumina, for example. The insulating layer 77 is made of photoresist, for example.

In the present embodiment, the yoke layer 41 is disposed over the magnetic layers 40, 46 and 48 and the insulating layer 79. The first coupling part 44 (the magnetic layers 45 and 46) and the magnetic layer 43 magnetically couple the main pole 15 and the yoke layer 41 to each other. The second coupling part 34 (the magnetic layers 35 to 40) magnetically couples the yoke layer 31 and the yoke layer 41 to each other. The magnetic layers 42, 47 and 48 magnetically couple the first shield 16A of the write shield 16 and the yoke layer 41 to each other. The magnetic head according to the present embodiment is without the stopper layer 91.

The remainder of configuration, function and effects of the present embodiment are similar to those of the second embodiment.

Fourth Embodiment

Figure 13:
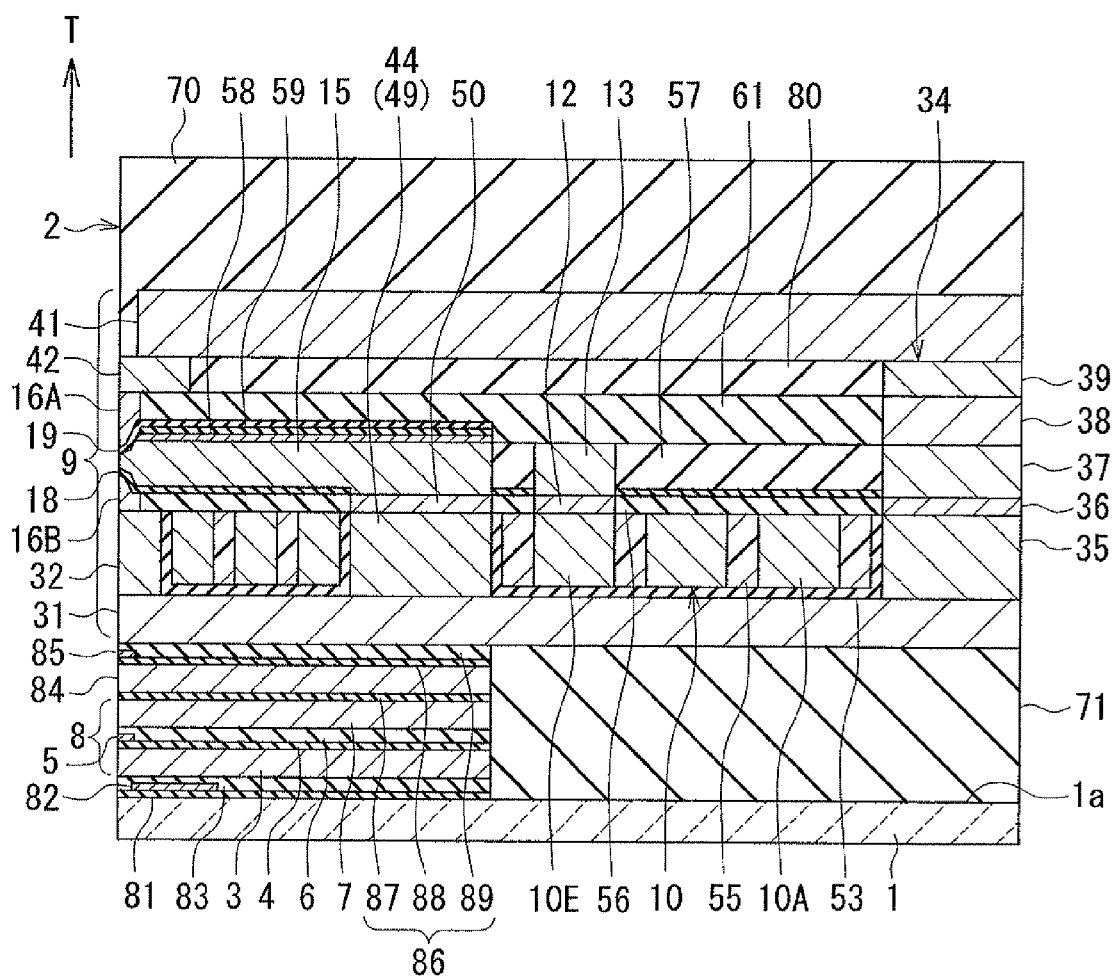
FIG. 13 is a cross-sectional view of a magnetic head according to a fourth embodiment of the invention.

A magnetic head according to a fourth embodiment of the invention will now be described with reference to FIG. 13. FIG. 13 is a cross-sectional view of the magnetic head according to the present embodiment. FIG. 13 shows a cross section perpendicular to the medium facing surface and the top surface of the substrate, or the main cross section, in particular.

The magnetic head according to the present embodiment is different from the magnetic head according to the first embodiment in the following respects. In the present embodiment, there are not provided the magnetic layer 43, the insulating layers 54 and 62 to 64, and the stopper layer 91. In the present embodiment, the first coupling part 44 is composed of a single magnetic layer 49 instead of the magnetic layer 45. The magnetic layer 49 is disposed on the yoke layer 31 at a position away from the medium facing surface 2. The magnetic layer 49 lies between the magnetic layers 32 and 35.

In the present embodiment, the winding portion 10A of the coil 10 is wound around the first coupling part 44 (the magnetic layer 49), and a part of the winding portion 10A passes between the first coupling part 44 (the magnetic layer 49) and the second coupling part 34 (the magnetic layer 35). In the example shown in FIG. 13, the winding portion 10A is wound approximately three turns around the first coupling part 44 (the magnetic layer 49).

The magnetic head according to the present embodiment has: an insulating layer 53 made of an insulating material and interposed between the coil 10 and each of the yoke layer 31 and the magnetic layers 32, 35 and 49; an insulating layer 55 made of an insulating material and disposed around the coil 10 and in the space between every adjacent turns of the coil 10; and a not-shown insulating layer made of an insulating material and disposed around the magnetic layers 32 and 35 and the insulating layer 53. The top surfaces of the coil 10, the magnetic layers 32 and 35 and the not-shown insulating layer are even with each other. The insulating layer 53 and the not-shown insulating layer are made of alumina, for example. The insulating layer 55 is made of photoresist, for example.

In the present embodiment, the write head unit 9 has a connection layer 12 and a lead layer 13, instead of the lead layer 11. The connection layer 12 and the lead layer 13 are both made of a conductive material such as copper. The connection layer 12 and the lead layer 13 are used for passing an electric current through the coil 10. The connection layer 12 is disposed on the coil connection part 10E of the coil 10.

The write head unit 9 further has a magnetic layer 50 made of a magnetic material and disposed on the magnetic layer 49. In the present embodiment, the insulating layer 56 is disposed around the second shield 16B, the magnetic layers 36 and 50 and the connection layer 12, and covers the coil 10 and the insulating layers 53 and 55. Examples of materials that can be used for the magnetic layer 50 include CoFeN, CoNiFe, NiFe, and CoFe.

In the present embodiment, the first gap layer 18 has an opening for exposing the top surface of the connection layer 12 and an opening for exposing the top surface of the magnetic layer 50. The bottom end of the main pole 15 is in contact with the top surface of the magnetic layer 50 at a position away from the medium facing surface 2. The lead layer 13 is electrically connected to the connection layer 12 through the opening of the first gap layer 18. The coil connection part 10E of the coil 10 is electrically connected to the lead layer 13 via the connection layer 12. In the present embodiment, the nonmagnetic layer 57 is disposed around the main pole 15, the second shield 16B, the side shields 16C and 16D, the magnetic layer 37 and the lead layer 13.

In the present embodiment, the nonmagnetic layer 61 is disposed around the first shield 16A and the magnetic layer 38. The magnetic head according to the present embodiment further has an insulating layer 80 made of an insulating material and disposed on the nonmagnetic layer 61 around the magnetic layers 39 and 42. The top surfaces of the magnetic layers 39 and 42 and the insulating layer 80 are even with each other. The yoke layer 41 is disposed over the magnetic layers 39 and 42 and the insulating layer 80. The insulating layer 80 is made of alumina, for example.

In the present embodiment, the first coupling part (the magnetic layer 49) and the magnetic layer 50 magnetically couple the main pole 15 and the yoke layer 31 to each other. The second coupling part 34 (the magnetic layers 35 to 39) magnetically couples the yoke layer 41 and the yoke layer 31 to each other. The present embodiment is different from the first embodiment in that the yoke layer 31 corresponds to the second yoke layer of the invention while the yoke layer 41 corresponds to the first yoke layer of the invention. That is, in the present embodiment, the first yoke layer 41 is located forward of the main pole 15 along the direction T of travel of the recording medium, while the second yoke layer 31 is located backward of the main pole 15 along the direction T of travel of the recording medium.

The remainder of configuration, function and effects of the present embodiment are similar to those of the first embodiment.

The present invention is not limited to the foregoing embodiments, and various modifications may be made thereto. For example, the second coupling part 34 may be located on at least either one of two opposite sides in the track width direction relative to the first coupling part 44.

The coil may have a winding portion that is formed into a stack of three or more layers and wound around the first coupling part, and that includes a part passing between the first coupling part and the second coupling part.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording of data to be written on a recording medium, the magnetic head comprising:

a medium facing surface configured to face the recording medium;

a coil configured to produce a magnetic field corresponding to the data to be written on the recording medium, the coil including a winding portion of planar spiral shape that is formed in one or more layers;

a main pole having an end face located in the medium facing surface, configured to allow a magnetic flux corresponding to the magnetic field produced by the coil to pass, and configured to produce a write magnetic field for writing the data on the recording medium by means of a perpendicular magnetic recording system;

a write shield made of a magnetic material and having an end face located in the medium facing surface, the end face of the write shield including a first end face portion located forward of the end face of the main pole along a direction of travel of the recording medium, and a second end thee portion located backward of the end face of the main pole along the direction of travel of the recording medium, the write shield including: (i) a first shield having the first end face portion, and (ii) a second shield having the second end face portion;

a gap part made of a nonmagnetic material and disposed between the main pole and the write shield;

a first yoke layer and a second yoke layer that are aligned along the direction of travel of the recording medium such that the main pole is interposed between the first and second yoke layers, each of the first and second yoke layers being made of a magnetic material and magnetically connected to the write shield, the first yoke layer being located backward of the main pole along the direction of travel of the recording medium, the second yoke layer being located forward of the main pole along the direction of travel of the recording medium, and the second yoke layer being magnetically connected to the first shield;

a substrate having a top surface;

a first coupling part located away from the medium facing surface and magnetically coupling the main pole and the second yoke layer to each other;

a second coupling part located away from the medium facing surface and magnetically coupling the first yoke layer and the second yoke layer to each other without touching the main pole; and a magnetic layer for magnetically coupling the second shield and the first yoke layer to each other, the magnetic layer being located backward of the second shield along the direction of travel of the recording medium and in contact with the second shield;

wherein:

the winding portion is wound around the first coupling part, and a part of the winding portion passes between the first coupling part and the second coupling part;

the coil, the pole layer, the write shield, the gap part, the first yoke layer, the second yoke layer, the first coupling part the second coupling part, and the magnetic layer are disposed above the top surface of the substrate; and in a cross section that intersects the end face of the main pole and that is perpendicular to the medium facing surface and the top surface of the substrate, the magnetic layer is greater than the second shield and smaller than the first yoke layer in length in a direction perpendicular to the medium facing surface.

2. The magnetic head for perpendicular magnetic recording according to claim 1, wherein the second coupling part is located in a position other than between the coil and the medium facing surface.

3. The magnetic head for perpendicular magnetic recording according to claim 1, wherein the second coupling part is located farther from the medium facing surface than is the first coupling part.

4. The magnetic head for perpendicular magnetic recording according to claim 1, wherein the end face of the write shield further includes a third end face portion and a fourth end face portion, the third end face portion and the fourth end face portion being located on opposite sides of the end face of the main pole in a track width direction.

5. The magnetic head for perpendicular magnetic recording according to claim 1, further comprising a read head unit located backward of the first and second yoke layers along the direction of travel of the recording medium, the read head unit including a read element that reads data written on the recording medium, and first and second read shield layers that are disposed such that the read element is interposed therebetween.

* * * * *